Feb. 17, 1953 J. FRYE 2,628,473
STATIONARY POWER PLANT HAVING RADIALLY AND
AXIALLY DISPLACED JET ENGINES
Filed May 3, 1948 3 Sheets-Sheet 1

INVENTOR
Jack Frye
BY
Donald F. McCarthy
ATTORNEY

Feb. 17, 1953 J. FRYE 2,628,473
STATIONARY POWER PLANT HAVING RADIALLY AND
AXIALLY DISPLACED JET ENGINES
Filed May 3, 1948 3 Sheets-Sheet 2
Fig. 3.
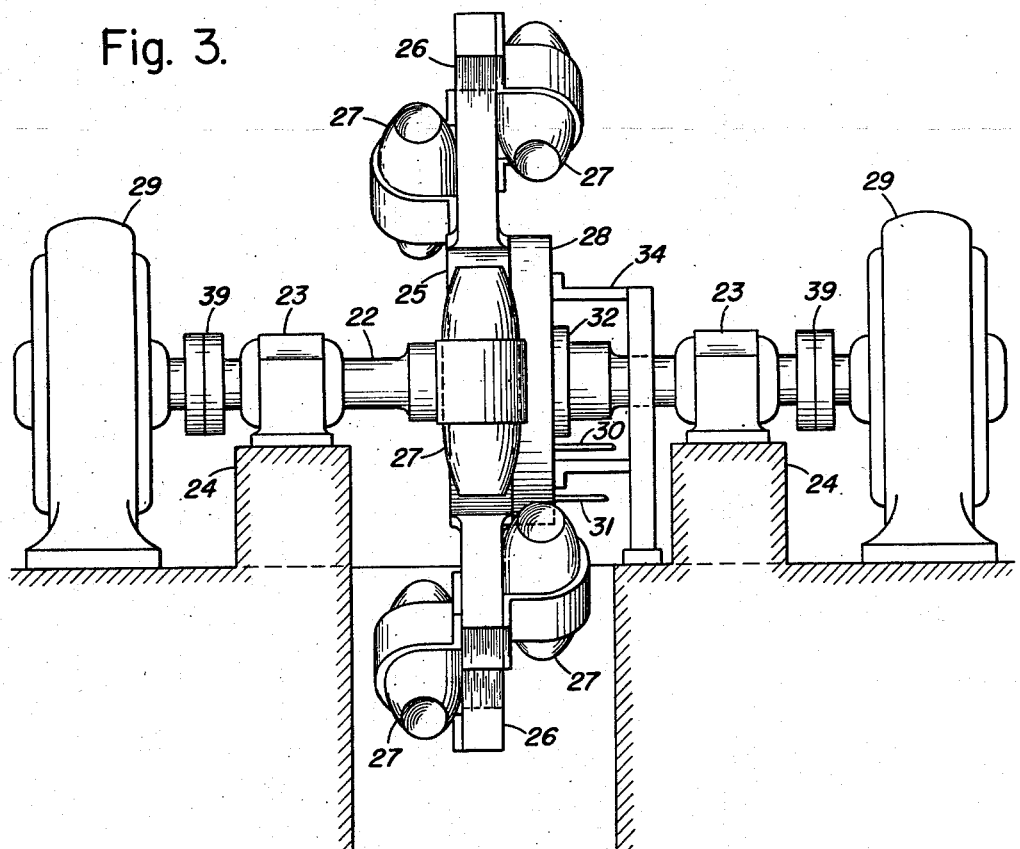
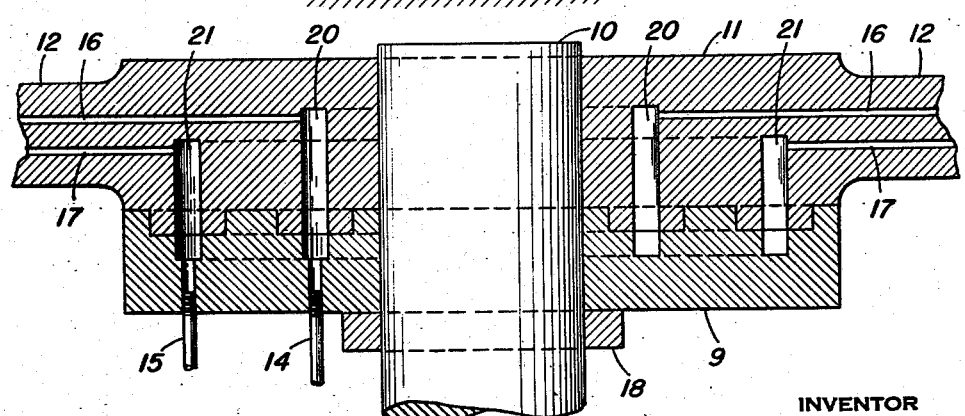
Fig. 4.
INVENTOR
Jack Frye
BY
Donald F. McCarthy
ATTORNEY Feb. 17, 1953 J. FRYE 2,628,473
STATIONARY POWER PLANT HAVING RADIALLY AND
AXIALLY DISPLACED JET ENGINES
Filed May 3, 1948 3 Sheets-Sheet 3

INVENTOR
Jack Frye
BY
ATTORNEY

Patented Feb. 17, 1953

2,628,473

UNITED STATES PATENT OFFICE 2,628,473

STATIONARY POWER PLANT HAVING RADIALLY AND AXIALLY DISPLACED JET ENGINES

Jack Frye, Sedona, Ariz.

Application May 3, 1948, Serial No. 24,887

24 Claims. (Cl. 60—39.35)

This invention relates to power development and has for an object the provision of a new and improved stationary power plant. More particularly, the invention contemplates the provision of a stationary power plant utilizing the capacity of the jet engine for developing relatively high efficiencies at high speeds or velocities of linear movement. By stationary power plant, I mean a power plant capable of generating power in quantities sufficient for general utility purposes, as distinguished, for example, from power plants used to provide the motive power for airplanes. I do not intend to exclude, however, power plants capable of use in providing the motive power for large transportation devices such, for example, as war ships and ocean liners, where the power required for moving the power plant itself is relatively insignificant as compared with the total amount of motive power required and developed.

My invention utilizes the capacity of jet engines to operate with increasingly high efficiencies, within certain limits, at increasingly high speeds. My investigations indicate that a power plant employing jet engines operating at linear velocities not lower than about six hundred (600) miles per hour can be so designed as to develop efficiencies greater than the efficiencies of engines employed heretofore in stationary power plants. In practicing my invention, I employ means for utilizing jet engines at speeds capable of providing efficiencies as high as, or higher than, the efficiencies of fuel burning engines of the types of diesel engines and gasoline motors employed heretofore. For the development of higher efficiencies, I prefer to provide power plants comprising jet engines designed to operate at linear speeds higher than about seven hundred fifty (750) miles per hour or higher than the velocity of sound at any normal atmospheric pressure.

A power plant of the invention comprises a driven shaft which may be connected in any suitable manner with an electric generator or with any other suitable apparatus to be operated, a jet engine having a combustion chamber, means for connecting the jet engine operatively with the driven shaft, means for delivering a mixture of fuel and oxidant to the combustion chamber of the jet engine, and means for igniting the mixture of fuel and oxidant within the combustion chamber.

Any suitable type of jet engine may be employed. Thus, for example, I may employ a ram jet engine, that is, an engine in which no provision is made for air compression other than by the ram action resulting from movement of the engine through the atmosphere, I may employ a turbine-jet engine in which compression of air is effected by a combination of ram action and turbine action, or I may employ a rocket type of jet engine.

In the preferred apparatus of the invention, two or more jet engines are arranged symmetrically and radially about the driven shaft. The engines are mounted on supporting means rigidly connected to the driven shaft, and they function to effect rotation of the driven shaft when the power plant is in operation. The driven shaft may be supported by any suitable type of bearing or bearings. The engines may be mounted on separate supporting arms rigidly attached to the driven shaft, or they may be mounted on a solid or discontinuous flywheel or framework rigidly attached to the driven shaft.

The driven shaft may be mounted for rotation about a vertical axis, in which case the jet engines and jet engine supports will be mounted for revolution in horizontal planes and orbits, or, the driven shaft may be mounted for rotation about a horizontal axis, in which latter case the jet engines and jet engine supports will be mounted for revolution in vertical planes and orbits.

The jet engines preferably are mounted for revolution in vertically spaced orbits, when the driven shaft is mounted for rotation about a vertical axis, or for revolution in horizontally spaced orbits, when the driven shaft is mounted for rotation about a horizontal axis. The jet engines may be mounted advantageously on opposite sides of the supports and in alignment with the supports to provide for revolution in a plurality of orbits.

Any suitable number of jet engines may be employed in a single power plant for driving a single driven shaft. In order to provide for effective and efficient mounting and operation, the jet engines may be disposed at different radial distances from the driven shaft. The disposition and arrangement should be such as to avoid undue obstruction of the jet of one engine by the body of another and to avoid too great pollution of the atmosphere to be utilized by the jet engines when engines utilizing the ram jet principle are employed.

In the preferred form of apparatus, I may rely entirely on the oxygen of the atmosphere to provide oxygen in proper amount and proportion, I may provide an auxiliary source of oxidant to supplement the oxygen of the atmosphere, or I may utilize a source of oxidant other than the atmosphere to provide all of the oxidant required for combustion of the fuel provided. Means may be provided for providing fuel of any suitable type such as solid, liquid or gaseous fuel and of any suitable character or composition such, for example, as carbonaceous fuel or non-carbonaceous fuel. Among the preferred fuels are gasoline, ethyl alcohol, acetylene and hydrogen. Gaseous and liquid oxygen and oxygen-enriched gases may be employed when desirable.

When the atmosphere is polluted with products of combustion, I prefer to employ oxygen or oxygen-enriched gas in conjunction with the atmospheric gas in order to provide for the production of a suitable combustible mixture. In order to produce more rapid combustion and higher temperatures, when desired, I employ mixtures of oxygen with hydrogen or with acetylene. Such mixtures, of course, are employed under controlled conditions to prevent the development of undesirably high temperatures, that is, temperatures which might be destructive of the apparatus. Such mixtures are admirably suitable for use in conjunction with polluted gases picked up by ram action and which are either wholly incapable of supporting combustion or incapable of supporting combustion at a satisfactory rate.

Power plants of the invention may be designed to produce any desired rate of rotation of the driven shaft. A suitable range includes rates of rotation not lower than about 500 R. P. M. and not higher than about 1000 R. P. M. Operation at relatively low rates of rotation may be desirable for structural reasons in view of the possible massiveness of high capacity forms of the apparatus and the considerable centrifugal forces which can be developed.

Gaseous oxidants and fuels may be compressed and delivered to the jet engines in suitable quantities and under suitable pressures by means of power generated by the power plant in which they are utilized. Compression of air in amounts required for use can be accomplished efficiently, and this fact permits the use of the rocket type jet engine with continuous delivery of both fuel and oxidant being provided for. Fuels and oxidants may be supplied to the jet engines in any suitable manner. Conduits communicating with an annular manifold surrounding the driven shaft function satisfactorily.

The invention will be better understood from a consideration of the following description in conjunction with the accompanying drawings in which Fig. 1 is a plan of apparatus of the invention in which the jet engines are mounted for revolution in horizontal orbits about the axis of a vertical shaft, the view being as seen from line 1—1 of Fig. 2;

Fig. 3 is an elevation of apparatus similar to that shown in Figs. 1 and 2 but in which the jet engines are mounted for revolution in vertical orbits about the axis of a horizontal shaft;

Fig. 4 is a section on line 4—4 of Fig. 1 illustrating a simple fuel and oxidant delivery means;

Figure 1:
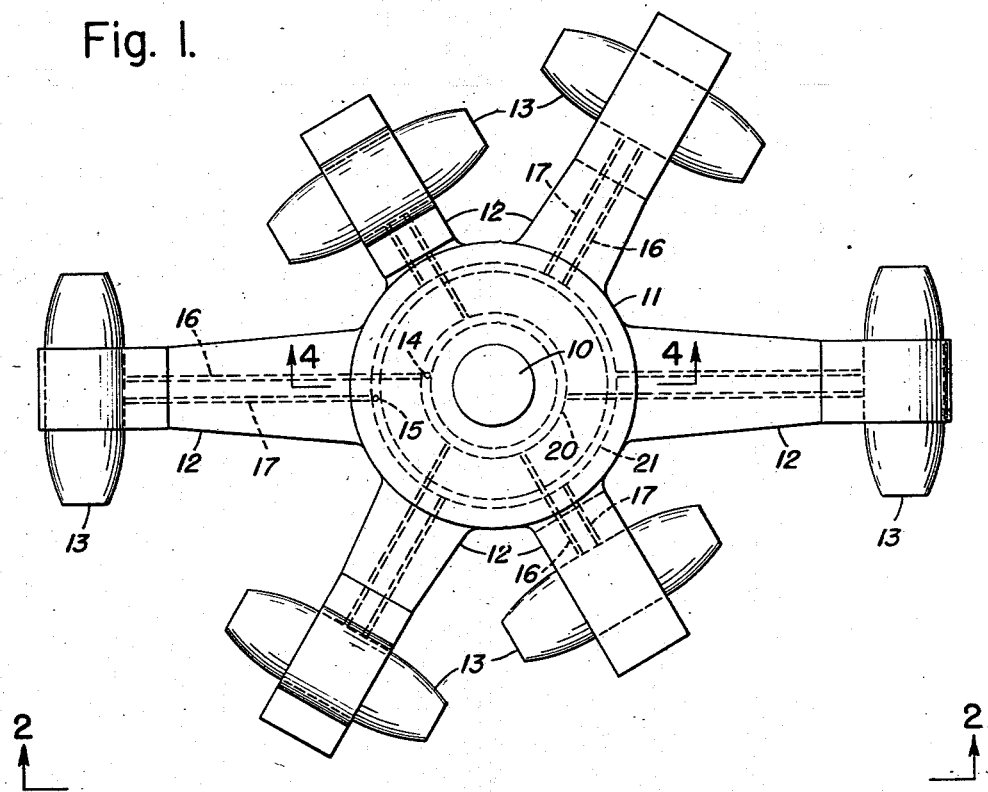
Figure 2:
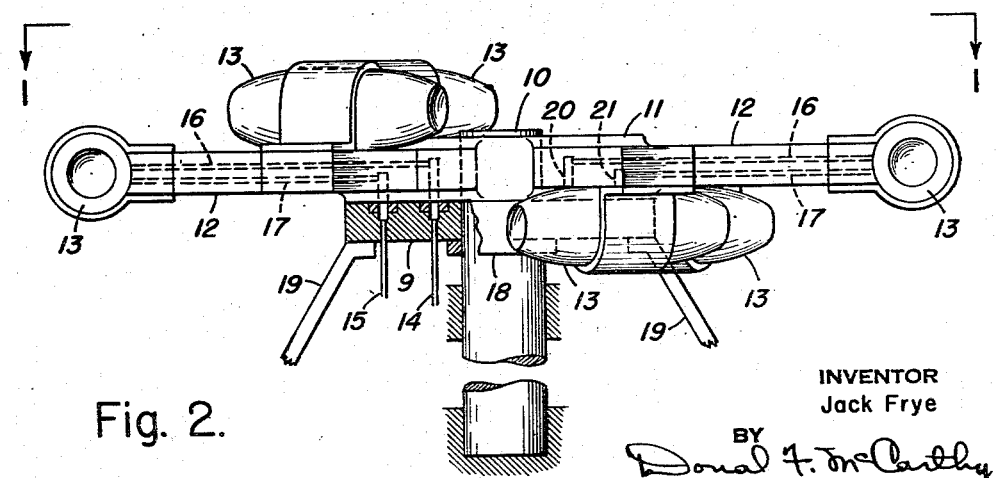
Fig. 2 is an elevation of the apparatus, the view being as seen from line 2—2 of Fig. 1.

The apparatus illustrated in Figs. 1 and 2 of the drawings comprises a driven shaft 10 to which is rigidly attached a jet engine support comprising a central manifold section 11 and supporting arms 12. Jet engines 13 are rigidly mounted on the supporting arms 12 at different radial distances from the driven shaft and in different vertical positions for revolution in vertically spaced orbits. The jet engines preferably are so mounted on the support that, in operation, the jets issuing therefrom are directed substantially tangentially of the orbits of revolution of the engine.

The central manifold section 11 co-operates with a fixed manifold section 9 to provide channels for delivering fluid fuel and oxidant from the fuel supply line 14 and the oxidant supply line 15 through conduits 16 and 17, respectively, in the supporting arms 12, to the jet engines, as shown in Fig. 4. The details of connecting the fuel and oxidant supply lines to the combustion chambers have not been illustrated, as the provision of a suitable arrangement requires only simple mechanical skill and any suitable arrangement may be employed.

The fixed manifold section 9 is held in contact with the manifold section 11 by means of a collar 18 fixed on and rotatable with the driven shaft, and it may be held against rotation by any suitable means as, for example, the braces 19 which may be anchored in any suitable manner. Annular grooves in the manifold sections 9 and 11 communicate to form annular channels 20 and 21 which communicate with the fuel conduits 14 and 16 and the oxidant conduits 15 and 17, respectively. Grooves and ridges in the contacting faces of the manifold section provide means for sealing the interiors of the annular channels 20 and 21 from communication with one another. Any suitable sealing device may be substituted for the simple device shown for purposes of illustration.

The apparatus shown in Fig. 3 is similar to that shown in Figs. 1, 2 and 4. It differs from the apparatus shown in Figs. 1 and 2 primarily in the arrangement of the driven shaft, engines and engine supporting means. The driven shaft 22 is mounted for rotation about a horizontal axis in bearings 23 mounted on supporting foundations 24. The jet engine support comprising a central manifold section 25 and supporting arms 26 is rigidly mounted on the driven shaft 22 for rotation therewith substantially in vertical planes. Jet engines 27 are rigidly mounted on the supporting arms 26 at different radial distances from the driven shaft and in different horizontal positions for revolution in horizontally spaced orbits. As in the case of the jet engines of the apparatus illustrated in Figs. 1 and 2, the jet engines 27 are so mounted that, in operation, the jets issuing therefrom are directed substantially tangentially of the orbits of revolution of the engines.

The central manifold section 25 co-operates with a fixed manifold section 28 to provide channels for delivering fluid fuel and oxidant from the fuel supply line 30 and the oxidant supply line 31 through suitable conduits (not shown) in the supporting arms to the jet engines. The structures of the manifold sections 25 and 28 and the arrangements of annular supply channels and conduits are identical with those shown in the apparatus illustrated in Figs. 1, 2 and 3.

The fixed manifold section 28 is held in contact with the manifold section 25 by means of a collar 32 fixed on and rotatable with the driven shaft, and it may be held against rotation by any suitable means as, for example, the brace 34 which may be anchored in any suitable manner.

The driven shaft 22 is connected to two electric generators 29 by means of couplings 39. The generator may be connected to a utility supply system of any suitable type in any suitable manner.

Figure 5:
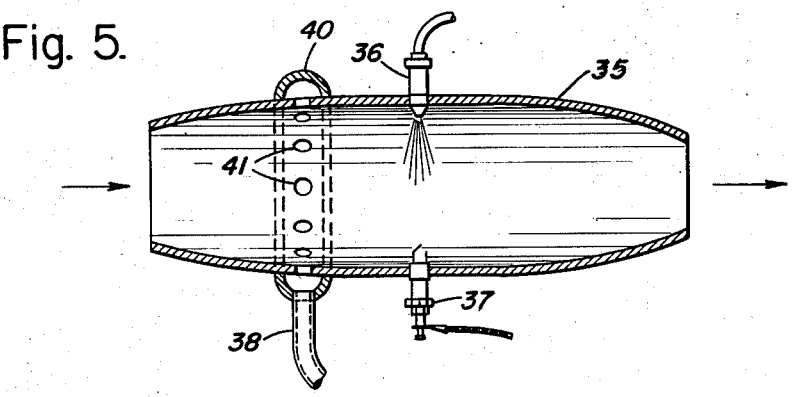
Fig. 5 is a diagrammatic section of a modified simple ram jet type of engine.

Fig. 5 illustrates a simple ram jet engine comprising a divergent-convergent duct 35 into which fuel is injected by means of the injector 36 and burnt in such manner that the heat is released directly to the air stream flowing through the duct 35. A further advantage is obtained by entrainment of the products of combustion with the air flow with consequent addition to the mass of the propulsive jet. Any suitable ignition means as, for example, a spark plug 37, may be provided for either intermittent or continuous use, as required.

Provision is made for a supplementary supply of air, oxygen or other oxidant through a conduit 38 which communicates with the interior of the duct 35 through a manifold 40 and apertures 41 in the casing wall of the duct 35.

Figure 6:
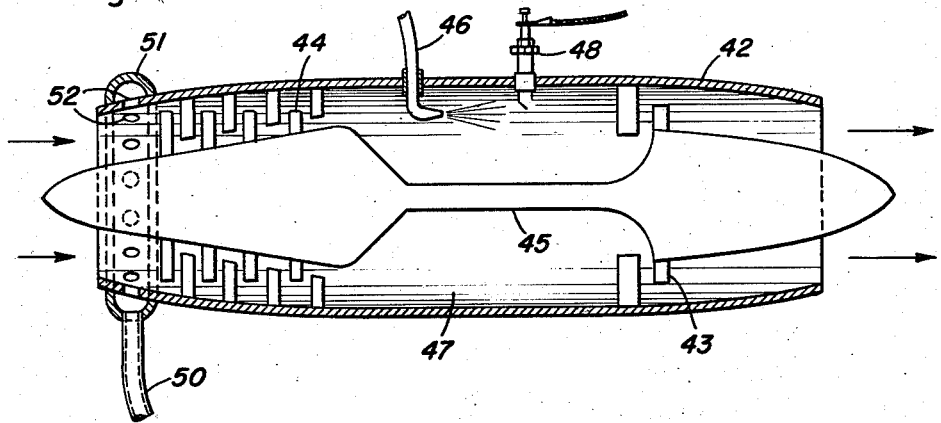
Fig. 6 is a diagrammatic section of a modified turbine jet type of engine.

The jet engine illustrated in Fig. 6 comprises a tube or duct 42 and a gas turbine 43 and compressor 44 mounted on a common shaft 45 in suitable bearings (not shown) within the tube or duct 42. An injector 46 is provided for supplying fuel to the combustion chamber 47 of the engine. A spark plug 48 is provided for either intermittent or continuous use in igniting a fuel-oxidant mixture within the compression chamber. While a spark plug is shown, any suitable ignition means may be employed. As in the case of the simple ram jet type of engine, the fuel is burnt in such a manner that the heat is released directly to the air stream, and the products of combustion are entrained with the air flow and added to the mass of the propulsive jet.

A supplementary supply of air, oxygen or other oxidant may be obtained through a conduit 50 which communicates with the interior of the tube or duct 42 through a manifold 51 and apertures 52 in the casing wall of the duct or tube.

Figure 7:
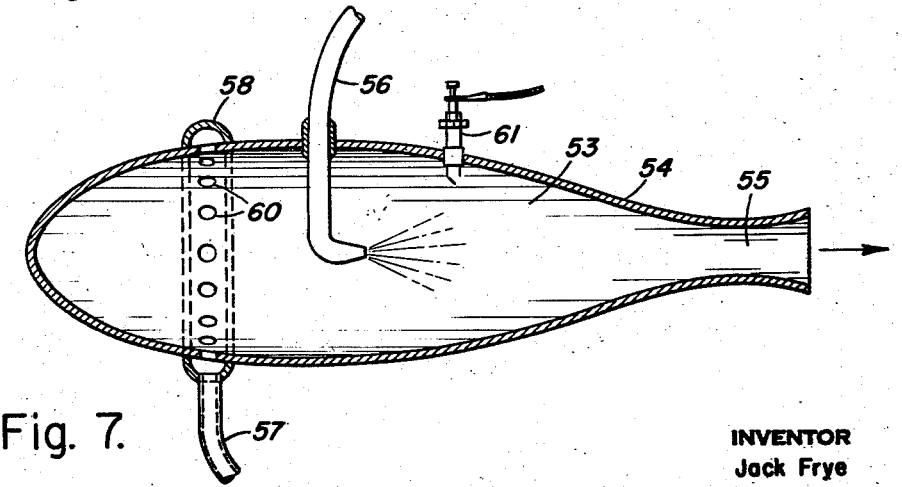
Fig. 7 is a diagrammatic section of a modified rocket type of engine.

Fig. 7 illustrates a rocket type jet engine having a combustion chamber 53 provided with a casing 54 and a jet orifice or opening 55. Fuel under pressure is supplied through an injector 56. Oxidant is supplied through a conduit 57 which communicates with the interior of the combustion chamber through a manifold 58 and apertures 60 in the wall of the casing 54. A spark plug 61 is provided for either intermittent or continuous use in igniting combustible mixtures within the combustion chamber.

In the operation of apparatus of the invention, fuel and oxidant are supplied to the combustion chambers of the jet engines employed at suitable pressures and in amounts suitable for effecting revolution of the engines and rotation of the driven shafts at the rates of speed desired. In the design of the apparatus, provision may be made for producing higher or lower rates of rotation of the driven shafts by decreasing or increasing the radial distances from the driven shafts of mounting the engines.

Some adjustment of the rates of delivery of fuel and oxidant to the combustion chambers may be made for engines disposed at different distances from the driven shaft, if desired, but close adjustment is not necessary, as the thrust effects of different engines are additive without any substantial loss in efficiency even when the thrusts have widely different values.

Power generated by the power plants of the invention may be utilized in any suitable manner either directly as mechanical energy or after conversion into electrical energy.

In designing power plants having different capacities for power production, I may employ jet engines of different sizes, and I may employ different numbers of jet engines. Thus, for example, for a power plant of small capacity, I may employ a single low-power jet engine, and, for a power plant of higher capacity, I may employ a single jet engine of suitably higher power or any suitable number of low-power or relatively high-power jet engines. The use of a single jet engine is advantageous, if power production requirements can be met, as it permits elimination of jet interference by a following engine and atmosphere pollution by a leading engine. In the claims the term "rotor" is employed to mean the rotatable combination of driven shaft and jet engine supporting means rigidly connected thereto.

I claim:
1. A stationary power plant comprising a rotor, at least two jet engines each having a combustion chamber and exhaust orifice in axial alignment and mounted in radially and axially displaced position on said rotor with respect to the other engine for revolution in spaced-apart orbits, means for delivering a mixture of fuel and oxidant to the combustion chambers of said engines at a point intermediate the ends of said chambers, and means for igniting said mixture within said chambers.

2. A stationary power plant comprising a rotor, at least two ram jet engines each having a combustion chamber and exhaust orifice in axial alignment and mounted in radially and axially displaced position on said rotor with respect to the other engine for revolution in spaced-apart orbits, means for delivering a mixture of fuel and oxidant to the combustion chambers of said engines at a point intermediate the ends of said chambers, and means for igniting said mixture within said chambers.

3. A stationary power plant comprising a rotor, at least two turbine jet engines each having a combustion chamber and exhaust orifice in axial alignment and mounted in radially and axially displaced position on said rotor with respect to the other engine for revolution in spaced-apart orbits, means for delivering a mixture of fuel and oxidant to the combustion chambers of said engines at a point intermediate the ends of said chambers, and means for igniting said mixture within said chambers.

4. A stationary power plant comprising a rotor, at least two rocket-type jet engines each having a combustion chamber and exhaust orifice in axial alignment and mounted in radially and axially displaced position on said rotor with respect to the other engine for revolution in spaced-apart orbits, means for delivering a mixture of fuel and oxidant to the combustion chambers of said engines at a point intermediate the ends of said chambers, and means for igniting said mixture within said chambers.

5. A stationary power plant comprising a rotor, at least two jet engines each having a combustion chamber and exhaust orifice in axial alignment and mounted in radially displaced position on said rotor with respect to the other engine for revolution in spaced-apart orbits, means for delivering a mixture of fuel and oxidant to the combustion chambers of said engines at a point intermediate the ends of said chambers, and means for igniting said mixture within said chambers.

6. A stationary power plant comprising a rotor, at least two ram jet engines each having a combustion chamber and exhaust orifice in axial alignment and mounted in radially displaced position on said rotor with respect to the other engine for revolution in spaced-apart orbits, means for delivering a mixture of fuel and oxidant to the combustion chambers of said engines at a point intermediate the ends of said chambers, and means for igniting said mixture within said chambers.

7. A stationary power plant comprising a rotor, at least two turbine jet engines each having a combustion chamber and exhaust orifice in axial alignment and mounted in radially displaced position on said rotor with respect to the other engine for revolution in spaced-apart orbits, means for delivering a mixture of fuel and oxidant to the combustion chambers of said engines at a point intermediate the ends of said chambers, and means for igniting said mixture within said chambers.

8. A stationary power plant comprising a rotor, at least two rocket-type jet engines each having a combustion chamber and exhaust orifice in axial alignment and mounted in radially displaced position on said rotor with respect to the other engine for revolution in spaced-apart orbits, means for delivering a mixture of fuel and oxidant to the combustion chambers of said engines at a point intermediate the ends of said chambers, and means for igniting said mixture within said chambers.

9. A stationary power plant comprising a rotor, at least two jet engines each having a combustion chamber and exhaust orifice in axial alignment and mounted in axially displaced position on said rotor with respect to the other engine for revolution in spaced-apart orbits, means for delivering a mixture of fuel and oxidant to the combustion chambers of said engines at a point intermediate the ends of said chambers, and means for igniting said mixture within said chambers.

10. A stationary power plant comprising a rotor, at least two ram jet engines each having a combustion chamber and exhaust orifice in axial alignment and mounted in axially displaced position on said rotor with respect to the other engine for revolution in spaced-apart orbits, means for delivering a mixture of fuel and oxidant to the combustion chambers of said engines at a point intermediate the ends of said chambers, and means for igniting said mixture within said chambers.

11. A stationary power plant comprising a rotor, at least two turbine jet engines each having a combustion chamber and exhaust orifice in axial alignment and mounted in axially displaced position on said rotor with respect to the other engine for revolution in spaced-apart orbits, means for delivering a mixture of fuel and oxidant to the combustion chambers of said engines at a point intermediate the ends of said chambers, and means for igniting said mixture within said chambers.

12. A stationary power plant comprising a rotor, at least two rocket-type jet engines each having a combustion chamber and exhaust orifice in axial alignment and mounted in axially displaced position on said rotor with respect to the other engine for revolution in spaced-apart orbits, means for delivering a mixture of fuel and oxidant to the combustion chambers of said engines at a point intermediate the ends of said chambers, and means for igniting said mixture within said chambers.

13. A stationary power plant comprising a rotor, at least two pairs of jet engines, each engine having a combustion chamber and exhaust orifice in axial alignment and each pair of engines being symmetrically mounted on said rotor in radially and axially displaced position with respect to the other pair of engines for revolution in spaced-apart orbits, means for delivering a mixture of fuel and oxidant to the combustion chambers of said engines at a point intermediate the ends of said chambers, and means for igniting said mixture within said chambers.

14. A stationary power plant comprising a rotor, at least two pairs of ram jet engines, each engine having a combustion chamber and exhaust orifice in axial alignment and each pair of engines being symmetrically mounted on said rotor in radially and axially displaced position with respect to the other pair of engines for revolution in spaced-apart orbits, means for delivering a mixture of fuel and oxidant to the combustion chambers of said engines at a point intermediate the ends of said chambers, and means for igniting said mixture within said chambers.

15. A stationary power plant comprising a rotor, at least two pairs of turbine jet engines, each engine having a combustion chamber and exhaust orifice in axial alignment and each pair of engines being symmetrically mounted on said rotor in radially and axially displaced position with respect to the other pair of engines for revolution in spaced-apart orbits, means for delivering a mixture of fuel and oxidant to the combustion chambers of said engines at a point intermediate the ends of said chambers, and means for igniting said mixture within said chambers.

16. A stationary power plant comprising a rotor, at least two pairs of rocket-type jet engines, each engine having a combustion chamber and exhaust orifice in axial alignment and each pair of engines being symmetrically mounted on said rotor in radially and axially displaced position with respect to the other pair of engines for revolution in spaced-apart orbits, means for delivering a mixture of fuel and oxidant to the combustion chambers of said engines at a point intermediate the ends of said chambers, and means for igniting said mixture within said chambers.

17. A stationary power plant comprising a rotor, at least two pairs of jet engines, each engine having a combustion chamber and exhaust orifice in axial alignment and each pair of engines being symmetrically mounted on said rotor in radially displaced position with respect to the other pair of engines for revolution in spaced-apart orbits, means for delivering a mixture of fuel and oxidant to the combustion chambers of said engines at a point intermediate the ends of said chambers, and means for igniting said mixture within said chambers.

18. A stationary power plant comprising a rotor, at least two pairs of ram jet engines, each engine having a combustion chamber and exhaust orifice in axial alignment and each pair of engines being symmetrically mounted on said rotor in radially displaced position with respect to the other pair of engines for revolution in spaced-apart orbits, means for delivering a mixture of fuel and oxidant to the combustion chambers of said engines at a point intermediate the ends of said chambers, and means for igniting said mixture within said chambers.

19. A stationary power plant comprising a rotor, at least two pairs of turbine jet engines, each engine having a combustion chamber and exhaust orifice in axial alignment and each pair of engines being symmetrically mounted on said rotor in radially displaced position with respect to the other pair of engines for revolution in spaced-apart orbits, means for delivering a mixture of fuel and oxidant to the combustion chambers of said engines at a point intermediate the ends of said chambers, and means for igniting said mixture within said chambers.

20. A stationary power plant comprising a rotor, at least two pairs of rocket-type engines, each engine having a combustion chamber and exhaust orifice in axial alignment and each pair of engines being symmetrically mounted on said rotor in radially displaced position with respect to the other pair of engines for revolution in spaced-apart orbits, means for delivering a mixture of fuel and oxidant to the combustion chambers of said engines at a point intermediate the ends of said chambers, and means for igniting said mixture within said chambers.

21. A stationary power plant comprising a rotor, at least two pairs of jet engines, each engine having a combustion chamber and exhaust orifice in axial alignment and each pair of engines being symmetrically mounted on said rotor in axially displaced position with respect to the other pair of engines for revolutilon in spaced-apart orbits, means for delivering a mixture of fuel and oxidant to the combustion chambers of said engines at a point intermediate the ends of said chambers, and means for igniting said mixture within said chambers.

22. A stationary power plant comprising a rotor, at least two pairs of ram jet engines, each engine having a combustion chamber and exhaust orifice in axial alignment and each pair of engines being symmetrically mounted on said rotor in axially displaced position with respect to the other pair of engines for revolution in spaced-apart orbits, means for delivering a mixture of fuel and oxidant to the combustion chambers of said engines at a point intermediate the ends of said chambers, and means for igniting said mixture within said chambers.

23. A stationary power plant comprising a rotor, at least two pairs of turbine jet engines, each engine having a combustion chamber and exhaust orifice in axial alignment and each pair of engines being symmetrically mounted on said rotor in axially displaced position with respect to the other pair of engines for revolution in spaced-apart orbits, means for delivering a mixture of fuel and oxidant to the combustion chambers of said engines at a point intermediate the ends of said chambers, and means for igniting said mixture within said chambers.

24. A stationary power plant comprising a rotor, at least two pairs of rocket-type jet engines, each engine having a combustion chamber and exhaust orifice in axial alignment and each pair of engines being symmetrically mounted on said rotor in axially displaced position with respect to the other pair of engines for revolution in spaced-apart orbits, means for delivering a mixture of fuel and oxidant to the combustion chambers of said engines at a point intermediate the ends of said chambers, and means for igniting said mixture within said chambers.

JACK FRYE.

REFERENCES CITED

The following references are of record in the file of this patent:

UNITED STATES PATENTS

| Number | Name | Date |
|---|---|---|
| 898,753 | Lees | Sept. 15, 1908 |
| 1,287,049 | Kramer | Dec. 10, 1918 |
| 2,180,168 | Puffer | Nov. 14, 1939 |
| 2,220,066 | Cornell | Nov. 5, 1940 |
| 2,395,403 | Goddard | Feb. 26, 1946 |
| 2,402,826 | Lubbock | June 25, 1946 |
| 2,444,742 | Lutjen | July 6, 1948 |
| 2,446,266 | Cummings | Aug. 3, 1948 |
| 2,448,972 | Gizara | Sept. 7, 1948 |
| 2,474,685 | McCollum | June 28, 1949 |
| 2,481,235 | Parr | Sept. 6, 1949 |
| 2,499,863 | Hart | Mar. 7, 1950 |
| 2,509,359 | Margolis | May 30, 1950 |

FOREIGN PATENTS

| Number | Country | Date |
|---|---|---|
| 3,561 | Great Britain | Aug. 16, 1881 |
| 366,450 | Great Britain | Mar. 3, 1932 |
| 400,894 | Great Britain | Nov. 2, 1933 |
| 581,217 | Great Britain | Oct. 4, 1946 |
| 627,121 | France | May 30, 1927 |
| 863,484 | France | Jan. 2, 1941 |